United States Patent
Niehorster et al.

(10) Patent No.: US 8,047,336 B2
(45) Date of Patent: Nov. 1, 2011

(54) DISC BRAKE WEAR ADJUSTER

(75) Inventors: Keith Niehorster, South Glamorgan (GB); Paul Roberts, Newport (GB); Martin Pors Taylor, Torfaen (GB)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 1018 days.

(21) Appl. No.: 11/744,263

(22) Filed: May 4, 2007

(65) Prior Publication Data

US 2007/0256901 A1  Nov. 8, 2007

(30) Foreign Application Priority Data

May 5, 2006  (GB) .................................. 0608956.9

(51) Int. Cl.
*F16D 66/02* (2006.01)

(52) U.S. Cl. .............. 188/1.11 L; 188/71.9; 188/196 C; 188/196 V

(58) Field of Classification Search .............. 188/1.11 E, 188/1.11 I, 71.9, 196 V, 196 R, 196 C
See application file for complete search history.

(56) References Cited

U.S. PATENT DOCUMENTS

| | | | |
|---|---|---|---|
| 6,129,183 A | 10/2000 | Ward | |
| 6,272,914 B1 * | 8/2001 | Ciotti | 188/11 |
| 6,276,494 B1 * | 8/2001 | Ward et al. | 188/1.11 W |
| 7,322,447 B2 * | 1/2008 | Deckhut et al. | 188/1.11 L |

FOREIGN PATENT DOCUMENTS

| | | |
|---|---|---|
| DE | 1555897 | 11/1979 |
| EP | 1596092 | 11/2005 |
| WO | 95/09991 | 4/1995 |
| WO | 97/29298 | 8/1997 |
| WO | 2004/111484 | 12/2004 |

OTHER PUBLICATIONS

European Search Report mailed on Sep. 7, 2007.
United Kingdom Search Report dated Aug. 31, 2006.

* cited by examiner

*Primary Examiner* — Bradley King
(74) *Attorney, Agent, or Firm* — Carlson, Gaskey & Olds, PC

(57) ABSTRACT

A co-axial wear adjuster and wear sensor for a brake caliper includes a sleeve having an external tooth form engageable with a toothed adjustment wheel of a brake tappet. The sleeve rotates with the tappet and is threaded to engage a relatively non-rotatable, but axially movable, bolt. A wear sensor is partly within the sleeve and has a plunger operably engaged with the bolt. The bolt may be tubular to carry a screw-threaded head whereby a position of the plunger may be set.

25 Claims, 1 Drawing Sheet

DISC BRAKE WEAR ADJUSTER

REFERENCE TO RELATED APPLICATIONS

This application claims priority to United Kingdom Patent Application No. GB 0608956.9 filed on May 5, 2006.

BACKGROUND OF THE INVENTION

This invention relates generally to a wear adjuster of a disc brake, particularly to an air actuated a disc brake.

Disc brakes, as are well known, include a rotor and a brake caliper which straddles the rotor and can be actuated to apply a braking force to the rotor via opposed brake pads. In commercial vehicles, air actuation is almost universal, and an air actuator is provided at each vehicle wheel to actuate the brake caliper mechanically via a lever.

It is not generally practicable to arrange the actuating mechanism at an outboard side of the rotor, and thus the relevant components are always located at an inboard side. Particularly with vehicles having smaller wheels, such inboard mounting is rather space consuming so that design freedom of suspension and steering components may be compromised. Furthermore, the provision of additional features, such as wear sensors, may be problematic.

In one conventional design, the actuating mechanism includes an inboard tappet operable to directly apply an inboard brake pad, an automatic wear adjuster at one side of the tappet, a manual wear adjuster at the other side of the tappet, and a wear sensor having an electrical output indicative of brake pad and rotor wear. In addition to physically locating these components in the brake caliper, each component must also be sealed against moisture and dirt to avoid corrosion and/or seizure.

EP-A-1596092, in the name of the present applicant, proposes a rotary wear indicator mounted on a manual wear adjuster mechanism that has a visual output for giving an indication of pad wear to a mechanic. The wear indicator is removed for de-adjustment of the adjuster mechanism (for example, to replace worn brake pads) and must be re-set upon replacement.

What is required is a wear adjuster/wear indicator which is adapted for replacement or adjustment of brake pads without requiring re-setting or calibrating.

SUMMARY OF THE INVENTION

According to the invention, there is provided an assembly of a wear adjuster and a wear indicator of a brake caliper. The wear adjuster has an axis of rotation and includes a sleeve rotatable about the axis of rotation. The wear indicator includes a body at one end of the sleeve and a plunger movable relative to the body on the axis of rotation. The plunger is located within the sleeve.

The wear adjuster and the wear indicator are coaxial, thus minimizing the space occupied and permitting direct abutment between the wear adjuster and the wear indicator. In one embodiment, the assembly further includes a bolt screw-threaded in the sleeve at the opposite end to the body. The bolt is adapted to be restrained against rotation and has a head engaged by the plunger.

In such an arrangement, rotation of the sleeve as a consequence of incremental wear adjustment causes axial movement of the bolt due to the screw-threaded connection, and hence relative movement of the plunger on the axis. A wear sensor may, for example, be a linear transducer having an output indicative of a relative extension of the plunger. The output is preferably electrical and adapted to be directly proportional to movement of the incremental wear adjuster. In one example, the wear sensor includes a cylindrical body from which the plunger protrudes and which is inserted at least partially in the sleeve.

In one embodiment, the bolt is tubular and internally screw-threaded to receive a separate head protruding on a plunger side for contact with the plunger. In such an arrangement, the initial relative position of the plunger may be set by screwing the head relative to the bolt. Thereafter, no further adjustment of the head is required in the event that the wear sensor is removed to permit rotation of the adjuster sleeve, for example, for de-adjustment of the usual tappet.

The sleeve can be turned by an internal discontinuity that is engageable by a turning tool inserted via the mouth of the sleeve. Alternatively, a slot at the mouth may be provided.

BRIEF DESCRIPTION OF THE DRAWINGS

Other features of the invention will be apparent from the following description of a preferred embodiment illustrated by way of example only in the accompanying drawings in which.

DETAILED DESCRIPTION OF THE PREFERRED EMBODIMENT

Figure 1:
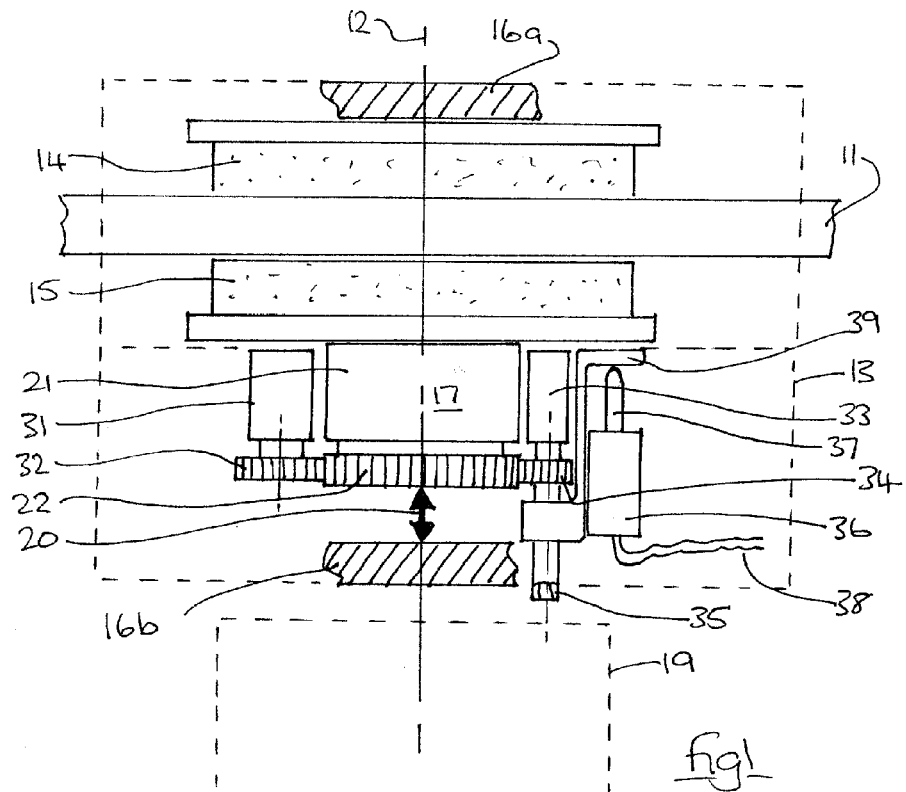
FIG. 1 illustrates in schematic plan a conventional disc brake installation of a commercial vehicle.

A conventional air actuated brake caliper installation is illustrated schematically in FIG. 1. A brake rotor 11 has an axis of revolution 12. Bridging the brake rotor 11 is a brake caliper body 13 (dotted outline) including a fixed part mounted on a vehicle axle/stub axle and a sliding (bridge) part adapted to transfer braking forces from an inboard side to an outboard side of the brake rotor 11.

Brake pads 14 and 15 are arranged on either side of the brake rotor 11. The outboard brake pad 14 is actuated by an outboard member 16a of the sliding part. The inboard brake pad 15 is actuated via a tappet assembly 17 slidable in the sliding part and reacts against an inboard member 16b of the sliding part.

A brake actuator 19 acts via a conventional operating lever (not shown) to urge the tappet assembly 17 and the inboard member 16b (as represented by an arrow 20) apart, thus directly applying the inboard brake pad 15 to the brake rotor 11, and indirectly applying the outboard brake pad 14 to the brake rotor 11 via the outboard member 16a.

The tappet assembly 17 includes a cylindrical tappet 21 internally threaded and slidable, but not relatively rotatable, in the caliper body 13. The tappet assembly 17 includes an adjuster wheel 22 screw threaded to the cylindrical tappet 21. The adjuster wheel 22 is externally toothed as illustrated, and relative rotation thereof results in an increase or reduction in an axial length of the tappet assembly 17.

The brake caliper includes several additional components on the inboard side. A wear adjuster includes a body 31 mounted in a caliper sliding part and a relatively rotatable toothed output wheel 32 in mesh with the adjuster wheel 22. The toothed output wheel 32 moves unidirectionally in operation (typically by virtue of a wrap spring or roller clutch), and the wear adjuster is actuated by an arm of the operating lever (not shown), which causes the separation indicated by an arrow 20.

Accordingly, the adjuster wheel 22 can be rotated by the toothed output wheel 32 to increase a length of the tappet assembly 17 to compensate for wear of the brake pads 14 and 15 and the brake rotor 11. Such an arrangement is well known and need not be further described here.

A manual adjuster is provided on an opposite side of the tappet assembly 17 that includes a shaft 33 which incorporates a de-adjuster wheel 34 in mesh with the adjuster wheel 22. The shaft 33 extends axially on the inboard side and terminates in a head 35 adapted to receive a turning tool. Any suitable head form may be provided (internal or external) such that application of the turning tool, such as a socket spanner, can rotate the de-adjuster wheel 34 to permit a reduction in length of the tappet assembly 17 for fitting of replacement brake pads. The wear adjuster may need to be deactivated to permit de-adjustment, and the de-adjuster may be used in reverse for setting an initial pad/rotor clearance after pad replacement.

Also mounted in the sliding part of the caliper body 13 is an electronic wear sensor including a fixed body 36 and a resiliently biased plunger 37. The plunger 37 bears against a cranked arm 39 which is screw-threaded to the shaft 33. As the brake pads wear, the adjuster wheel 22, and consequently the manual de-adjuster wheel 34, is rotated. As a result, the cranked arm 39 moves in the direction of the axis of revolution 12 and hence alters the extension of the plunger 37 with respect to the fixed body 36, thus giving a changing electrical output via leads 38. The wear sensor may, for example, include a linear potentiometer giving an output voltage proportional to extension of the plunger 37.

The pitch of the screw thread between the cranked arm 39 and the shaft 33 may be different from that of the tappet assembly 17 to give a desired output signal from the wear sensor. Such an arrangement is known and need not be further described here.

Figure 2:
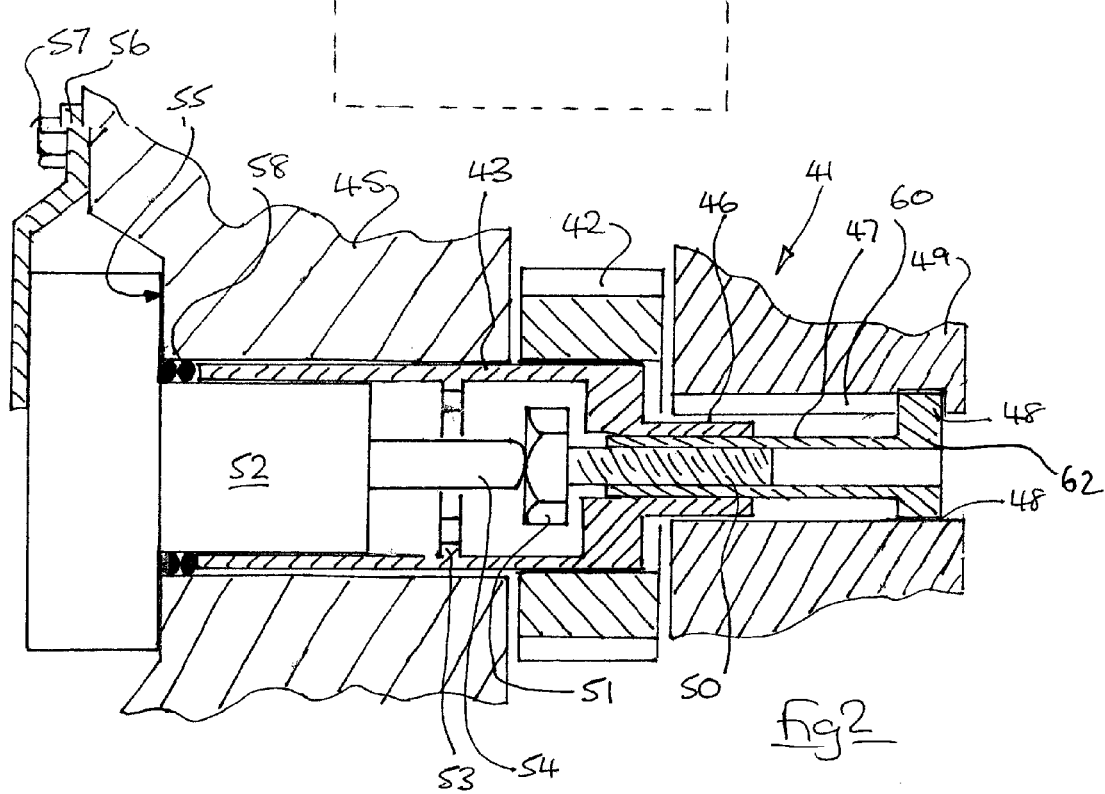
FIG. 2 is a schematic axial section through a combined adjuster/wear sensor according to the invention.

FIG. 2 illustrates an embodiment of the invention. A combined wear adjuster/wear sensor 41 includes a toothed adjuster wheel 42 for mesh with a tappet adjuster wheel 22. The toothed adjuster wheel 42 is equivalent to the de-adjuster wheel 34 of FIG. 1.

A tubular body 43 (also referred to as a sleeve) is fast within the toothed adjuster wheel 42 and extends to the inboard side. The tubular body 43 can rotate with the toothed adjuster wheel 42 within a support defined by a caliper bridge 45.

A cylindrical extension 46 of the tubular body 43 projects towards an outboard side and has a screw threaded interior to receive a screw-threaded sleeve 47. An outboard end of the sleeve 47 has a projection 48 for non-rotational, but axially slidable, engagement with respect to the brake housing 49 via a keyway 60. The sleeve 47 is also screw threaded on the inside to receive a setting bolt 50 having a bolt head 51 at the inboard side. The assembled screw threaded sleeve 47 and the setting bolt 50 form a contact member 62. A cylindrical wear sensor 52 (or wear indicator) enters within the tubular body 43 and is in axial abutment with an outer face 55 of the caliper bridge 45. The wear sensor 52 is retained by a bracket 56 and a set screw 57. O-rings 58 provide a seal between the wear sensor 52 and the caliper bridge 45 to prevent ingress of moisture. The wear sensor 52 has a spring biased plunger 54 in contact with the bolt head 51, as illustrated.

The tubular body 43 has an internal hex 53 which is axially spaced from a body of the wear sensor 52. In use, the setting bolt 50 is located at a suitable projection from the sleeve 47 according to a length of the tappet assembly 17. The initial setting step plays no part in the function of the combined adjuster/wear indicator, and thereafter the setting bolt 50 and the sleeve 47 may be considered as a unitary contact member 62. In some circumstances, the setting bolt 50 may be omitted so that the plunger 54 bears directly on a suitably shaped end of the sleeve 47, which in that circumstance would form the contact member 62 alone.

In use, and with reference to FIG. 1, progressive wear of the brake pads 14 and 15 will cause relative rotation of the adjuster wheel 22 by the toothed output wheel 32. As a consequence of tooth meshing, the toothed adjuster wheel 42 will rotate. The sleeve 47 is however fixed against rotation with respect to the brake housing 49, and accordingly will move relatively to the right (as viewed) with respect to the tubular body 43. As a consequence, the plunger 54 will be pushed inwardly of the body of the wear sensor 52, thus changing the output thereof.

The plunger 54 moves into the wear sensor 52 and as it does, the output from the wear sensor 52 changes to continuously indicate an amount of wear. By utilizing continuous indication, the wear sensor 52 produces a signal indicating the amount of wear rather than a condition for replacement (i.e., binary indication). This may be achieved, for example, with a variable resistor actuated by the plunger 54.

As in the prior art, the sleeve 47 and the tubular body 43 may move at a different relative rate to the cylindrical tappet 21 and the adjuster wheel 22 to provide a desirable output range of the wear sensor 52, which is a direct indication of wear of the brake pads and the rotor. An exact linear relationship is not, however, a requirement of the invention provided that the effective stroke of the plunger can be related to the wearing thickness of the brake pads and the rotor.

Output from the wear sensor 52 is via a twisted wire pair, but other arrangements are possible. For example power, ground and signal wires may be provided.

When the brake pads are fully worn, and due for replacement, the wear sensor 52 is removed by releasing the set screw 57, and a hex key is applied to the internal hex 53 to wind the cylindrical tappet 21 inwards with respect to the adjuster wheel 22, at the same time screwing the sleeve 47 to the right with respect to the brake housing 49. After turning to the desired degree which permits pad replacement, the internal hex 53 may be wound in the opposite direction to set initial pad/rotor clearance. Thereafter, the wear sensor 52 is inserted up to the outer face 55, and the plunger 54 will extend under resilient loading to the bolt head 51 (at maximum extension).

The internal hex 53 may be provided at a different axial location, or may be substituted by some other suitable discontinuity (for example, a slot in the end of the tubular body 43), which is adapted to receive a turning tool.

Removal and replacement of the wear sensor 52 does not change the relative position of the plunger 54 with regard to brake pad thickness. Accordingly, the plunger 54 will adopt an appropriate extension without further setting measures, and thus a mechanic merely removes the wear sensor 52 to rotate the tubular body 43 and then replaces the wear sensor 52. Non-replacement of the wear sensor 52 may be sensed by the plunger 54 being at maximum extension, and accordingly starting of the vehicle engine may be inhibited.

The plunger 54 is in one example continuously in contact with the sleeve 47 during operation of the assembly during operation. "Operation" is defined as the situation in which the wear sensor 52 is installed on the brake, and as such is capable of indicating the brake wear.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. a brake caliper comprising:
a tappet assembly having a tappet axis;
a tappet adjuster wheel rotatable about the tappet axis; and
an assembly of a wear de-adjuster and a wear indicator, the wear de-adjuster having an axis of rotation and including a sleeve having a de-adjuster wheel rotatable about the axis of rotation, and the wear indicator including a body at one end of the sleeve, the wear indicator including a plunger movable relative to the body on the axis of rotation, wherein the plunger is located within the sleeve and the de-adjuster wheel is in direct meshing engagement with the tappet adjuster wheel.

2. The brake caliper according to claim 1 wherein the sleeve is rotatable with respect to the body.

3. The brake caliper according to claim 1 wherein the sleeve includes a discontinuity adapted to receive a turning tool on the axis of rotation.

4. The brake caliper according to claim 3 wherein the discontinuity is internal.

5. The brake caliper according to claim 3 wherein the discontinuity is at the one end of the sleeve adjacent the body.

6. The brake caliper according to claim 1 wherein a portion of the body is inserted into the sleeve.

7. The brake caliper according to claim 1 further including a contact member axially movable relative to the sleeve, wherein the plunger contacts the contact member.

8. The brake caliper according to claim 7 wherein the contact member is rotatably fixed.

9. The brake caliper according to claim 8 wherein the contact member has an external thread in engagement with the sleeve, wherein rotation of the sleeve causes axial movement of the contact member.

10. The brake caliper according to claim 9 wherein the contact member is at an opposite end of the sleeve to the body.

11. The brake caliper according to claim 7 wherein the contact member is extendable.

12. The brake caliper according to claim 11 wherein the contact member includes an internally threaded sleeve and an externally threaded bolt.

13. The brake caliper according to claim 1 wherein the plunger is biased to an extended position relative to the body.

14. The brake caliper according to claim 1 wherein the wear indicator is electrical.

15. The brake caliper according to claim 1 wherein the assembly is configured to be mounted directly to a disc brake caliper.

16. The brake caliper according to claim 1 wherein the wear indicator continuously indicates an amount of wear of a brake pad.

17. The brake caliper according to claim 1 further including a variable resistor actuated by the plunger.

18. The brake caliper according to claim 7 wherein the plunger is continuously in contact with the contact member during operation of the assembly.

19. The brake caliper according to claim 1 wherein the body is fixed and constrained from movement relative to, and along, the axis of rotation.

20. The brake caliper according to claim 1 further including a contact member axially movable relative to the sleeve, wherein the plunger contacts the contact member, the sleeve is rotatable in the brake caliper and restrained from movement along the axis of rotation, and the contact member is keyed to the brake caliper for movement along the axis of rotation.

21. The brake caliper according to claim 20 wherein the body is engaged against rotation and axial movement with respect to the axis of rotation.

22. The brake caliper according to claim 1 wherein an entirety of the plunger is received in the sleeve.

23. The brake caliper according to claim 1 wherein the body contacts the sleeve.

24. The brake caliper according to claim 1 wherein the tappet assembly is configured to slide in a body of a brake caliper to apply a braking force.

25. The brake caliper according to claim 1 wherein the tappet assembly is configured to change length upon rotation of the tappet adjuster wheel.

* * * * *